(12) United States Patent
Briers

(10) Patent No.: US 10,099,746 B2
(45) Date of Patent: Oct. 16, 2018

(54) GEAR SHIFT ARRANGEMENT

(71) Applicant: Marthinus Briers, Port Elizabeth (ZA)

(72) Inventor: Marthinus Briers, Port Elizabeth (ZA)

( * ) Notice: Subject to any disclaimer, the term of this patent is extended or adjusted under 35 U.S.C. 154(b) by 16 days.

(21) Appl. No.: 15/038,757

(22) PCT Filed: Oct. 28, 2014

(86) PCT No.: PCT/IB2014/065650
§ 371 (c)(1),
(2) Date: May 24, 2016

(87) PCT Pub. No.: WO2015/075582
PCT Pub. Date: May 28, 2015

(65) Prior Publication Data
US 2017/0158286 A1 Jun. 8, 2017

(30) Foreign Application Priority Data
Nov. 25, 2013 (ZA) .................................. 2013/08844

(51) Int. Cl.
| F16H 9/00 | (2006.01) |
| F16H 59/00 | (2006.01) |
| F16H 61/00 | (2006.01) |
| F16H 63/00 | (2006.01) |
| B62M 9/14 | (2006.01) |
| F16H 9/24 | (2006.01) |
| B62K 23/02 | (2006.01) |
| B62M 25/02 | (2006.01) |

(Continued)

(52) U.S. Cl.
CPC ............... B62M 9/14 (2013.01); B62K 23/02 (2013.01); B62M 25/02 (2013.01); B62M 25/08 (2013.01); F16H 9/24 (2013.01); F16H 7/06 (2013.01)

(58) Field of Classification Search
CPC . B62M 9/14; B62M 9/10; B62M 9/16; B62M 1/36; B62M 25/08
USPC .................................................. 474/77
See application file for complete search history.

(56) References Cited

U.S. PATENT DOCUMENTS

| 295,480 | A | * | 3/1884 | Briggs | .................... | B62M 9/10 |
| | | | | | | 474/137 |
| 890,333 | A | * | 6/1908 | Chard et al. | ............. | B62M 9/10 |
| | | | | | | 474/77 |

(Continued)

FOREIGN PATENT DOCUMENTS

| FR | 2610060 B1 | 3/1991 |
| WO | 9727099 A1 | 7/1997 |
| WO | 03064242 A1 | 8/2003 |

OTHER PUBLICATIONS

International Search Report in International Application No. PCT/IB2014/065650. (7 pages total).

(Continued)

*Primary Examiner* — Henry Y Liu
(74) *Attorney, Agent, or Firm* — Oppenhuizen Law PLC; David L. Oppenhuizen

(57) ABSTRACT

The invention discloses a gear shift arrangement, which includes a sprocket cassette being adapted to be slidably mounted on a hub which is adapted to move on a horizontal axis of a spindle, the sprocket cassette further being adapted to operatively engage with a chain so that, in operation, the chain remains in one vertical plane; and movement means adapted to move the sprocket cassette along the hub transversely relative to the chain.

20 Claims, 5 Drawing Sheets

(51) Int. Cl.
*B62M 25/08* (2006.01)
*F16H 7/06* (2006.01)

(56) References Cited

U.S. PATENT DOCUMENTS

| | | | | | |
|---|---|---|---|---|---|
| 2,117,116 | A | * | 5/1938 | Page | B62M 9/14 474/77 |
| 2,368,147 | A | * | 1/1945 | Lapeyre | B62M 9/131 474/72 |
| 3,165,002 | A | * | 1/1965 | Hatch | F16H 9/24 474/77 |
| 3,769,848 | A | * | 11/1973 | McGuire | B62M 9/14 474/70 |
| 4,490,127 | A | * | 12/1984 | Matsumoto | B62M 9/122 280/236 |
| 4,571,219 | A | * | 2/1986 | Breden | B62M 25/00 474/70 |
| 4,592,738 | A | * | 6/1986 | Nagano | B62M 9/14 474/162 |
| 4,713,042 | A | * | 12/1987 | Imhoff | B62M 9/14 474/69 |
| 4,790,554 | A | * | 12/1988 | Siegwart, Jr. | B62M 9/16 280/236 |
| 4,861,321 | A | * | 8/1989 | Siegwart, Jr. | B62M 9/16 474/111 |
| 5,205,794 | A | * | 4/1993 | Browning | B62M 9/14 474/160 |
| 5,354,243 | A | * | 10/1994 | Kriek | B62M 9/14 474/135 |
| 5,681,234 | A | * | 10/1997 | Ethington | B62M 9/122 280/261 |
| 6,173,982 | B1 | * | 1/2001 | Westergard | B62M 9/085 280/261 |
| 6,860,171 | B1 | * | 3/2005 | Nanko | B62M 3/003 474/160 |
| 7,258,637 | B2 | * | 8/2007 | Thomasberg | B62M 9/14 474/160 |
| 7,445,223 | B2 | * | 11/2008 | Hong | B62M 1/36 280/253 |
| 8,371,974 | B2 | * | 2/2013 | Morita | B62M 9/16 280/261 |
| 9,499,233 | B2 | * | 11/2016 | Schuster | B62M 9/08 |
| 9,725,132 | B2 | * | 8/2017 | Hara | B62M 1/36 |
| 2005/0215367 | A1 | * | 9/2005 | Thomasberg | B62M 9/14 474/78 |

OTHER PUBLICATIONS

Written Opinion of the International Searching Authority in International Application No. PCT/IB2014/065650. (8 pages total).

* cited by examiner

GEAR SHIFT ARRANGEMENT

CROSS REFERENCE

This application is a National Stage of International Application No. PCT/IB2014/065650 that was filed on Oct. 28, 2014; which claims priority to South African provisional patent Application Number 2013/08844 filed on Nov. 25, 2013.

FIELD OF INVENTION

The present invention relates to a gear shift arrangement.

More particularly, the present invention relates to a gear shift arrangement for bicycles wherein both front and rear gear sets are sequentially moved in their horizontal axis in a pre-determined manner to engage an optimum choice of gear ratios while the driving chain remains in an operatively fixed vertical plane.

BACKGROUND TO INVENTION

Current bicycle gears work by moving a bicycle chain amongst differently sized sprockets provided at the pedal axle (also known as the crank set) and at the rear wheel axle. The chain is moved by manual ratchet levers normally located on the handlebar that pull or release respective cables to actuate either a front or rear derailleur. A typical prior art bicycle gear mechanism is illustrated in FIG. 1. The front derailleur or cage is associated with the pedal axle and pushes against the sides of the chain to force it onto another sprocket. The rear derailleur, which also serves to keep the chain tensioned, is associated with the rear wheel axle and moves the chain along the cassette onto differently sized sprockets to change the gear ratios.

As an example, a modern mountain bike uses a 2×10 set up, having two sprockets at the pedal axle and a cassette of ten sprockets at the rear wheel axle, in theory allowing twenty gear ratio combinations. However, there are a few inherent problems with this design, namely:

- many of the gear ratio combinations are repeated or are very close to each other and thus a 2×10 gear shift mechanism does not in practice deliver 20 different ratio combinations;
- It is not possible to select usable gear ratio combinations between the lowest gear ratio and highest gear ratio where the ratio changes between all the gear ratios reduce progressively;
- It is not possible to shift from the highest gear to the lowest gear in one shift;
- excessive friction occurs with gear ratio combinations that require the chain to move out of a vertical plain, leading to a chain pulling skew with accompanying loss of power;
- the selection path during changing of gears leads to erratic ratio combinations that do not increase or decrease sequentially; and
- the rider has to change between front and back sprockets to try to minimize the power loss while selecting required ratios.

It is an object of the invention to suggest a bicycle gear shift arrangement, which will assist in overcoming these problems.

SUMMARY OF INVENTION

According to the invention both front and rear sprocket sets or cassettes of a bicycle are adapted to slide only horizontally around the crank and wheel hub spindles respectively and engage with a chain that is adapted to operate in one vertical fixed plane with both sprockets sets to effect optimum efficiency drive means.

The sprocket cassettes are moved sequentially with movement means to engage the chain with different diameter sprockets selected in combinations to effect predetermined gear ratios where it is possible that the change in ratio shifting from the lowest gear ratio to the highest gear ratio could be progressively less throughout the gear range, a result not possible with prior art bicycle gears.

The drive chain is guided in a fixed vertical plain while both sprocket sets are moved sequentially to change gears in a predetermined manner with preferable ratios.

A bicycle gear system according to the invention eliminates the problems associated with conventional bicycle gear systems.

According to the invention, a gear shift arrangement includes a sprocket cassette being adapted to be slidably mounted on a hub of a bicycle wheel which is adapted during use to move on a horizontal axis of a spindle, the sprocket cassette further being adapted to operatively engage with a chain so that, in operation, the chain remains in one vertical plane, and movement means adapted to move the sprocket cassette along the hub transversely relative to the chain.

Also according to the invention, a bicycle gear shift arrangement includes a second sprocket cassette being adapted to be slidably mounted on the spindle of the pedals, the second sprocket cassette further being adapted to operatively engage with a bicycle chain so that, in operation, the chain remains in one vertical plane; and movement means adapted to move the sprocket cassette along the spindle transversely relative to the chain.

The arrangement is adapted to keep the chain in one plane and the gears are adapted to move, front gear set or back gear set or a combination of front and back gear sets.

The sprocket cassette may include a number of adjacent sprockets of conventional varying diameters.

The movement means may be adapted to engage different sprockets of the sprocket cassette with the chain thereby to cause changes in gear ratios. It is thus possible to engage different combinations of two sets of sprockets (front and back in case of a bicycle) to get required and more desirable ratios with fewer sprockets.

As an example: Current bicycles shift from 12 to 11 teeth to get to top gear (9th to 10th), this being a 9% drop in pedal speed. When shifting from $8^{th}$ to $9^{th}$ the pedal speed drops 8.3%. This is undesirable as gear ratios at high speed should be closer in ratio to the next selected gear. By way of the arrangement in accordance with the invention it is possible to have a wider ratio at lower speeds and a close ratio at higher speeds. This is a considerable advantage.

As an example a bicycle gear system according to the invention can have five rear sprockets and three front sprockets can obtain 15 ratios, the same or more usable ratios as is done with the ten rear sprockets and two front sprockets on conventional bicycles.

This equates to substantial weight savings.

The movement means may require any electrical, electronic, mechanical, hydraulic or pneumatic system to be activated and positioned to engage with the chain in a controlled manner to obtain the required gear ratios.

Gear selection could be controlled with push buttons that enables the user to select gears. Push buttons could send a signal to a processor that selects combinations of sprockets to obtain the required ratio.

Gear selection could be automated using the pedal input speed to determine the best ratio to keep a rider in a desired pedal speed range.

Here follows a description of a bicycle gear shift arrangement that will effect gear selection with a chain fixed in a vertical plane according to the invention.

The movement means may include complementary slidably engaging first and second ramp members provided between the sprocket cassette and a bicycle frame.

The sprocket cassette may include a biasing spring being adapted to bias the sprocket cassette towards the ramp members.

The biasing spring may be a torsion spring.

The movement means may include a thrust bearing being adapted to isolate the ramp members from the sprocket cassette and the hub to permit independent rotation of the ramp members.

The movement means may include conventional cable actuation means being adapted to cause rotation of the ramp members to thereby cause movement of the sprocket cassette along the hub.

The arrangement may be sealed in a drum-like cover.

The movement means may include an electronic motor being adapted to operate the rotation of the ramp members.

The electronic motor may be a control stepper/stepping motor.

The electronic motor may include software being pre-programmed with specific gear ratios being adapted to prevent repetition of specific gear ratios and permitting sequential selection of gear ratios. The software may also allow the skipping of ratios and will take the shortest route to a desired ratio thereby eradicating rider error and confusion.

The invention eliminates the inherent problems of current bicycle gears:

It is possible to eliminate repeated gear ratios and have more useable ratios with less gears than prior art bicycles;

It is possible to select preferred gear ratio combinations between the lowest gear ratio and highest gear ratio where the ratio changes between all the gear ratios reduced progressively;

Unlike current bicycle gear systems where the chain can only be straight in the two of the gear ratio combinations, the chain is kept straight in a gear system according to the invention and eliminates wear and friction caused by an out of line chain;

A gear changing system according to the invention eliminates the problem of erratic gear combinations that the rider has to try to minimize by shifting between front and rear sprockets to seek a preferred ratio;

A gear changing system according to the invention eliminates the problem that a bicycle rider has to find suitable gear ratio combinations while trying to keep the chain as straight as possible to prevent excessive wear and friction;

A gear changing system according to the invention can shift sequentially through the gear range with push button input or shift in one shift from any gear to another by pushing and holding the hold button and selecting the required gear. The system will shift the required gear in one shift when the hold button is released.

The invention extends to a bicycle provided with a bicycle gear shift arrangement as described herein.

BRIEF DESCRIPTION OF DRAWINGS

The invention will now be described by way of example with reference to the accompanying schematic drawings.

In the drawings there is shown in.

DETAILED DESCRIPTION OF DRAWINGS

Figure 1:
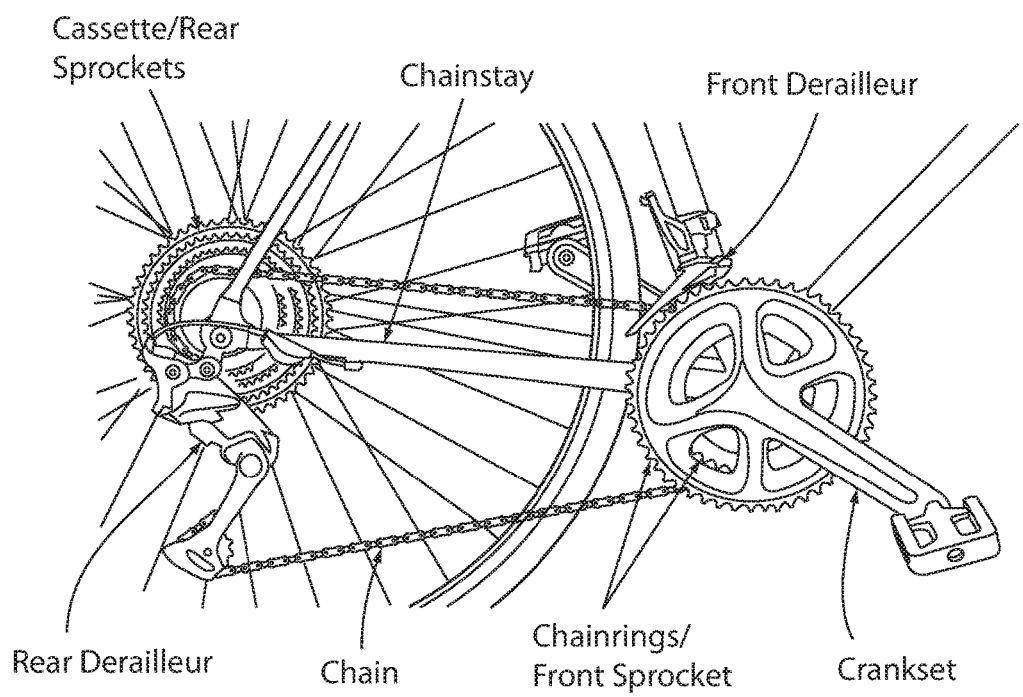
FIG. 1: A side view of a prior art bicycle gear mechanism.
Figure 2:
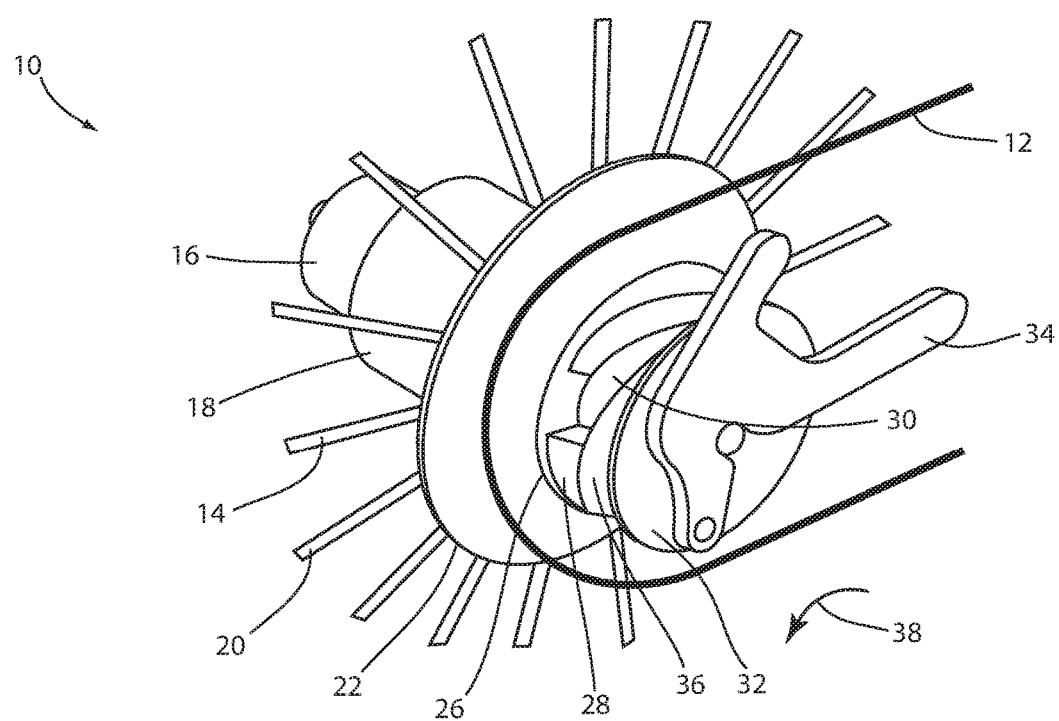
FIG. 2: A perspective view of an example of a rear sprocket cassette in a bicycle gear shift arrangement according to the invention.
Figure 3:
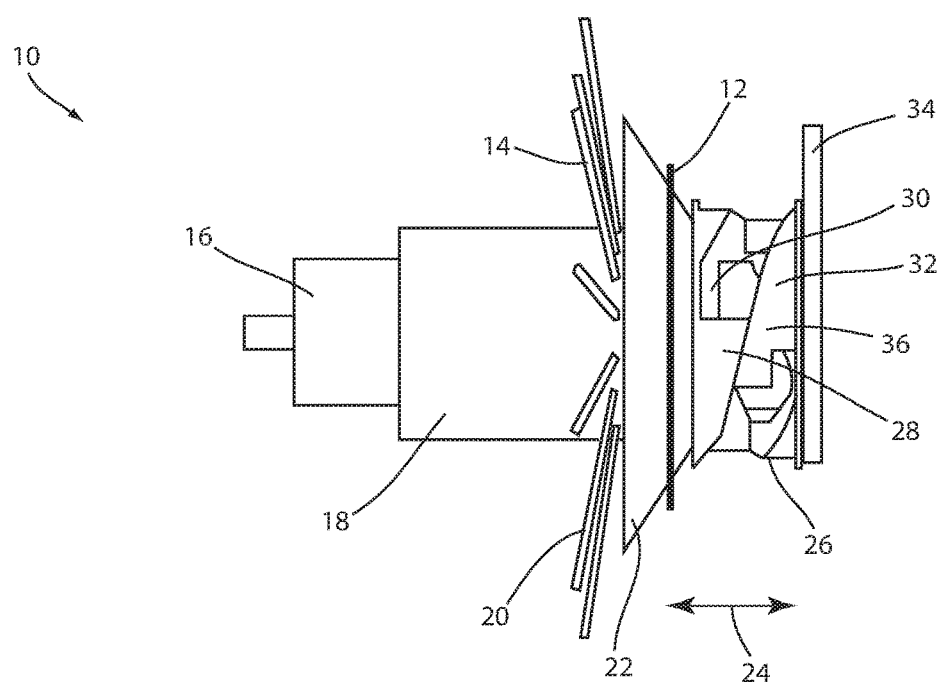
FIG. 3: A side view of the bicycle gear shift arrangement shown in FIG. 2.
Figure 4:
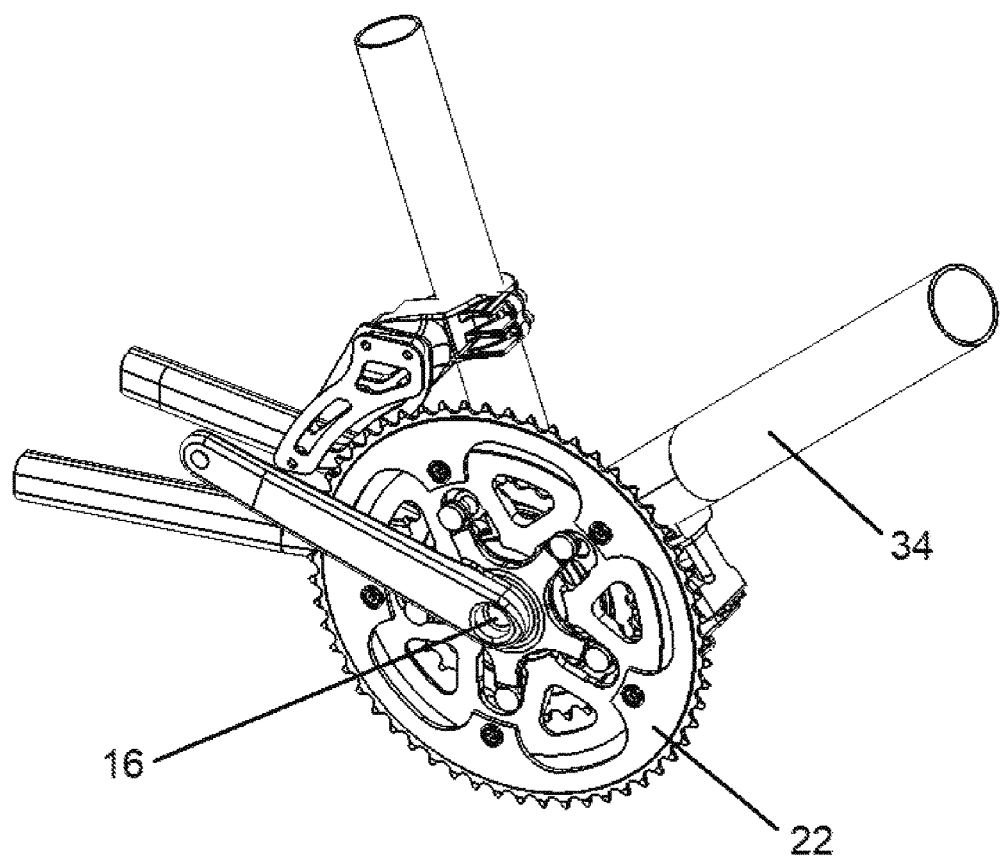
FIG. 4: A perspective view of an example of a crank sprocket set in a bicycle gear shift arrangement.
Figure 5:
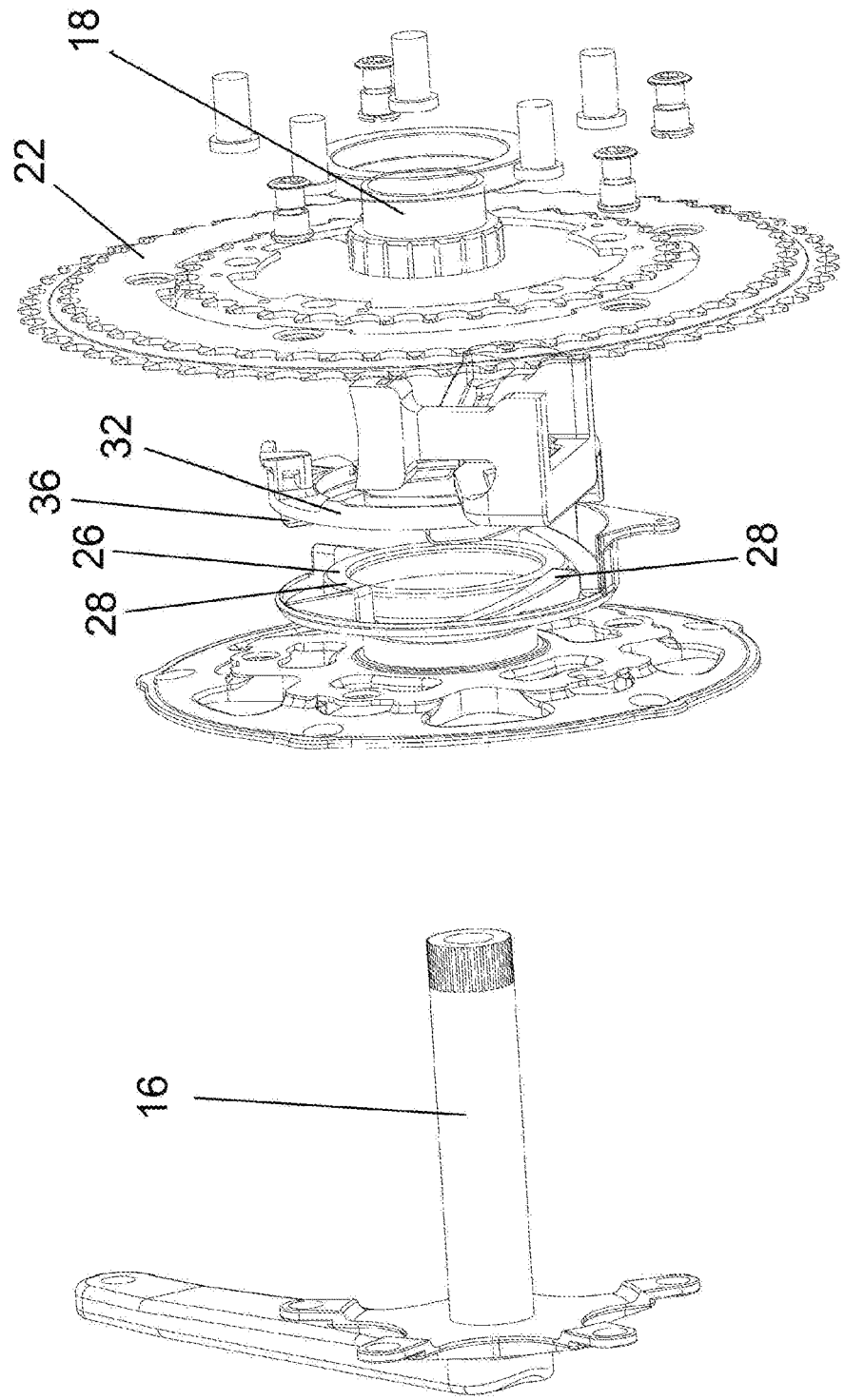
FIG. 5: An exploded view showing the crank sprocket set of FIG. 4.

The various embodiments of the present invention and its advantages are best understood by referring to FIGS. 1 through 3 of the drawings. The elements of the drawings are not necessarily to scale, emphasis instead being placed upon clearly illustrating the principles of the invention. Throughout the drawings, like numerals are used for the like and corresponding parts of the various drawings.

This invention may be provided in other specific forms and embodiments without departing from the essential characteristics as described herein. The embodiments described herein are to be considered in all aspects as illustrative only and not restrictive in any manner. The appended claims rather than the description and drawings indicate the scope of the invention.

A typical prior art bicycle gear mechanism is illustrated in FIG. 1. The front derailleur or cage is associated with the pedal axle and pushes against the sides of the chain to force it onto another sprocket. The rear derailleur, which also serves to keep the chain tensioned, is associated with the rear wheel axle and moves the chain along the cassette onto differently sized sprockets to change the gear ratios.

Referring to FIGS. 2 and 3 of the drawings, there is shown a bicycle gear shift arrangement in accordance with the invention, being generally indicated by reference numeral 10. The bicycle gear shift arrangement 10 is adapted to work with a standard bicycle chain 12 so as to drive a rear wheel 14 that is mounted on axle 16. Wheel 14 has a hub 18 from which a number of spokes 20 project radially in conventional manner.

A sprocket cassette 22, being adapted to operatively engage with the chain 12, is slidably mounted on the hub 18 so that it can be moved to-and-fro along the hub 18 in the directions indicated by arrow 24. Sprocket cassette 22 includes a number of adjacent sprockets (not shown) of conventional varying diameters wherein the sprocket having the largest diameter is located nearest to the spokes 20 and the sprocket having the smallest diameter is spaced furthest from the spokes 20. The sprocket cassette 22 includes a biasing spring (not shown) located between it and the hub 18 to bias the sprocket cassette 22 away from the spokes 20. The biasing spring can be a torsion spring. Chain 12 is adapted to remain in a constant vertical plane at a fixed distance away from the spokes 20 during use while the sprocket cassette 22 moves relative to the chain 12, as indicated by arrow 24, to engage different sprockets with the chain 12 thereby to cause changes in the gear ratios.

A first annular ramp member 26 is joined to the sprocket cassette 22. The first ramp member 26 has a number of ramp teeth 28 provided on its side projecting away from the sprocket cassette 22. A thrust bearing 30 isolates the ramp member 26 from sprocket cassette 22 and the hub 18 so that the ramp member 26 can rotate independently therefrom during use.

A second annular ramp member 32 is fixedly joined to a frame 34 of the bicycle. The second ramp member 32 also has a number of ramp teeth 36 provided on its side projecting away from the frame 34, whereby the respective ramp teeth 28, 36 slidably engage with each other.

In use, a convention cable actuation is utilized to rotate the first ramp member 26 in an anti-clockwise direction as indicated by arrow 38 (FIG. 2). The sliding movement of the engaging ramp teeth 28, 36 pushes the first ramp member 26 away from the frame 34, which consequently pushes the sprocket cassette 22 to slide along the hub closer towards the spokes 20. Thereby a sprocket with a smaller diameter engages with the chain 12.

Conversely, by relaxing the cable actuation, the biasing spring pushes sprocket cassette 22 away from the spokes 20, thereby causing ramp member 26 to rotate in a clockwise direction and allowing it to move closer to frame 34.

Amongst the advantages of this arrangement 10 are: the simplicity of the design, its small profile that does not excessively protrude from the frame 34, the linear motion of the chain 12 that is remains planar, ease of maintenance. The arrangement 10 is also very lightweight as the ramp member 26, 32 can be made from nylon.

The arrangement 10 is relatively easily installed or retrofitted on a bicycle and allows removal without requiring disassembling. The arrangement 10 can be sealed in a drum-like cover to keep dust and other wear agents out.

A chain tensioner (not shown) will take up any slack in the chain 12 due to its engagement on a smaller diameter sprocket as well as guide the chain to stay in a fixed vertical plain.

The cable actuator can be joined to an electronic motor to operate the rotation movement of the first ramp member 26. The electronic motor can be powered by a light and compact battery pack. The electronic motor will allow for sequential shifting as well as the facility to jump sprockets (i.e. many ratios) at a time. The gear ratios are electronically programmed into software on the electronic motor so that none of the gear ratios are repeated and allowing a user to switch to the correct gear ratios sequentially.

The electronic motor can be a control stepper/stepping motor. Stepper motors require a separately programmed microcontroller and can be very accurately controlled in this manner, though this control is usually over many revolutions. Stepper motors offer very accurate control with quick reactions and are cost effective as a motor unit.

A similar arrangement can be used as movement means for the front chain gears. A fixed chain guide situated at the leading edge of the front sprockets will keep the chain in a vertical plan.

The software assists the rider in gear selection and shifting, ensuring that sequential gears are available without the thought. This software will also allow the skipping of ratios and will take the shortest route to a desired ratio, eradicating rider error and confusion. The planar chain movement reduces friction and angular-force losses, drivetrain wear and cross-chaining problems.

The suggested electronic shifting to preselected gear combinations provides a practical working solution. Advantages are a straight chain with resulting reduced friction and loss, and fewer gears to achieve more preferred gear ratios with resultant weight savings.

As an example: Current bicycles shift from 12 to 11 teeth to get to top gear (9th to 10th), this being a 9% drop in pedal speed. When shifting from 8th to 9th the pedal speed drops 8.3%. By way of the arrangement in accordance with the invention it is possible to have a wider ratio at lower speeds and a close ratio at higher speeds. This is a considerable advantage.

As an example bicycle gear system according to the invention can have five rear sprockets and three front sprockets to obtain the same or more usable ratios as is done with the ten rear sprockets and two front sprockets on conventional bicycles resulting in a considerable weight savings.

As described above and shown in the associated drawings, the present invention comprises an apparatus for a gear shift. While particular embodiments of the invention have been described, it will be understood, however, that the invention is not limited thereto, since modifications may be made by those skilled in the art, particularly in light of the foregoing teachings. It is therefore contemplated by the appended claims to cover any such modifications that incorporate those features or those improvements that embody the spirit and scope of the present invention.

The invention claimed is:
1. A bicycle gear shift arrangement comprising:
   a rear sprocket cassette including at least two adjacent sprockets of varying diameter, the sprocket cassette slidably mounted on a rear wheel spindle and which is adapted to move on a horizontal axis of a rear wheel spindle, and a crank sprocket set including at least two adjacent sprockets of varying diameter, the crank sprocket set slidably mounted on a crank spindle and which is adapted to move on the horizontal axis of the crank spindle, the rear sprocket cassette and the crank sprocket set further being adapted to operatively engage with a chain so that, in operation, the chain remains in one fixed vertical plane;
   movement means adapted to move the sprocket cassette and the crank sprocket set along the spindles transversely relative to the chain to selectively engage the chain with a respective one of the sprockets in each of the sprocket cassette and the crank sprocket set, each combination of chained sprockets in the sprocket cassette and the crank sprocket set delivering a particular gear ratio from the crank spindle to the rear wheel spindle, the highest gear ratio associated with a smaller one of the sprockets in the crank sprocket set being higher than the lowest gear ratio associated with a larger one of the sprockets in the crank sprocket set, thereby providing at least one overlapping gear ratio associated with the sprockets in the crank sprocket set;
   the movement means including a user-activated input for selectively shifting the gear ratio up or down between a lowest gear ratio available and a highest gear ratio available, whereby the movement means is configured to move the sprocket cassette, the crank sprocket set, or both the sprocket cassette and the crank sprocket set in order to selectively and progressively increase or decrease the gear ratio between the lowest gear ratio available and the highest gear ratio available while avoiding any redundant gear ratios, and by selectively engaging the chain with the proper sprockets in the sprocket cassette and the crank sprocket set in order to deliver the overlapping gear ratio at the correct time in the progressive upward or downward shifting.
2. An arrangement as claimed in claim 1 which is adapted to keep the chain in one plane and the gears are adapted to move, front gear sets or back gear sets or a combination of front and back gear sets.

3. An arrangement as claimed in claim 1, in which the rear sprocket cassette and front sprocket set includes a number of adjacent sprockets of conventional varying diameters.

4. An arrangement as claimed in claim 1, in which the movement means is adapted to engage different sprockets of the rear sprocket cassette and the front sprocket set with the chain thereby to cause changes in gear ratios.

5. An arrangement as claimed in claim 4, which is adapted to enable different combinations of the sprockets to be engaged and thus obtain more desirable ratios where the gear ratio change shifting from the lowest to highest gear ratio combination throughout the gear ratio range is progressively less.

6. An arrangement as claimed in claim 1, which includes combinations of five rear sprockets and three front sprockets adapted to obtain 15 ratios.

7. An arrangement as claimed in claim 1, in which the movement means require any electrical, electronic, mechanical, hydraulic or pneumatic system to be activated and positioned to engage with the chain in a controlled manner to obtain the required gear ratios.

8. An arrangement as claimed in claim 7 in which gear selection is controlled with push buttons that enables the user to select gears sequentially from one gear ratio to the next or jumping gears by pushing a hold button before selecting the required gear ratio using the up and down shift buttons which is engaged by the controller on release of the hold button.

9. An arrangement as claimed in claim 1, in which gear selection is automated using the pedal input speed to determine the best ratio to keep a rider in a desired pedal speed range.

10. An arrangement as claimed in claim 1, in which the movement means includes complementary slidably engaging first and second ramp members provided between the sprocket cassette and a bicycle frame.

11. An arrangement as claimed in claim 1, in which the sprocket set includes a biasing spring being adapted to bias the sprocket set towards the ramp members.

12. An arrangement as claimed in claim 11, in which the biasing spring is a torsion spring.

13. An arrangement as claimed in claim 10, in which the movement means includes a thrust bearing being adapted to isolate the ramp members from the sprocket and the hub to permit independent rotation of the ramp members.

14. An arrangement as claimed in claim 10, in which the movement means include conventional cable actuation means being adapted to cause rotation of the ramp members to thereby cause movement of the sprocket along the hub.

15. An arrangement as claimed in claim 14, which is sealed in a drum-like cover.

16. An arrangement as claimed in claim 10, in which the movement means includes an electronic motor being adapted to operate the rotation of the ramp members.

17. An arrangement as claimed in claim 16, in which the electronic motor is a control stepper/stepping motor.

18. An arrangement as claimed in claim 16, in which the electronic motor includes software being pre-programmed with specific gear ratios being adapted to prevent repetition of specific gear ratios and permitting sequential selection of gear ratios.

19. A bicycle gear shift arrangement comprising:
a rear sprocket cassette including at least two adjacent sprockets of varying diameter, the sprocket cassette mounted on a rear wheel spindle, and a crank sprocket set including at least two adjacent sprockets of varying diameter, the crank sprocket set mounted on a crank spindle, the rear sprocket cassette and the crank sprocket set further being adapted to operatively engage with a chain to deliver rotational movement from the crank spindle to the rear wheel spindle;
movement means adapted to selectively engage the chain with a respective one of the sprockets in each of the sprocket cassette and the crank sprocket set, each combination of chained sprockets in the sprocket cassette and the crank sprocket set delivering a particular gear ratio from the crank spindle to the rear wheel spindle, the highest gear ratio associated with a smaller one of the sprockets in the crank sprocket set being higher than the lowest gear ratio associated with a larger one of the sprockets in the crank sprocket set, thereby providing at least one overlapping gear ratio associated with the sprockets in the crank sprocket set;
the movement means including a user-activated input for selectively shifting the gear ratio up or down between a lowest gear ratio available and a highest gear ratio available, whereby the movement means is configured to change the sprocket in the sprocket cassette that is engaged with the chain, change the sprocket in the crank sprocket set that is engaged with the chain, or both of the sprockets in the sprocket cassette and the crank sprocket set that are engaged with the chain in order to selectively and progressively increase or decrease the gear ratio between the lowest gear ratio available and the highest gear ratio available while avoiding any redundant gear ratios, and by selectively engaging the chain with the proper sprockets in the sprocket cassette and the crank sprocket set in order to deliver any overlapping gear ratios at the correct sequence in the progressive upward or downward shifting.

20. The bicycle gear shift arrangement of claim 19 in which the movement means includes an electronic motor to selectively alter the sprockets with which the chain is engaged, the electronic motor being a control stepper/stepping motor that includes software that is pre-programmed with specific gear ratios, and the electronic motor uses the software to prevent repetition of specific gear ratios and to permit the sequential selection of gear ratios.

* * * * *